United States Patent
Shigeta

(10) Patent No.: US 7,310,434 B2
(45) Date of Patent: Dec. 18, 2007

(54) IMAGE PROCESSING APPARATUS AND METHOD

(75) Inventor: Kazuyuki Shigeta, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 884 days.

(21) Appl. No.: 10/191,427

(22) Filed: Jul. 10, 2002

(65) Prior Publication Data

US 2003/0012451 A1 Jan. 16, 2003

(30) Foreign Application Priority Data

Jul. 16, 2001 (JP) .............................. 2001-215442

(51) Int. Cl.
*G06K 9/00* (2006.01)

(52) U.S. Cl. ...................... 382/125; 382/264

(58) Field of Classification Search ................ 382/125, 382/274, 116, 124, 126, 264
See application file for complete search history.

(56) References Cited

U.S. PATENT DOCUMENTS

| 3,902,011 | A | | 8/1975 | Pieters et al. ................ 178/7.2 |
| 5,103,320 | A | | 4/1992 | Ito ............................... 358/461 |
| 5,455,690 | A | | 10/1995 | Ishikawa ..................... 358/461 |
| 5,500,745 | A | | 3/1996 | Iishiba et al. ................ 358/461 |
| 5,659,626 | A | * | 8/1997 | Ort et al. ..................... 382/125 |
| 6,072,895 | A | * | 6/2000 | Bolle et al. .................. 382/125 |
| 6,195,448 | B1 | * | 2/2001 | Schiller ........................ 382/126 |
| 6,263,091 | B1 | * | 7/2001 | Jain et al. .................... 382/125 |
| 6,879,344 | B1 | * | 4/2005 | Nakamura et al. .......... 348/362 |

FOREIGN PATENT DOCUMENTS

| DE | 199 57297 A1 | 5/2001 |
| JP | 8-289144 | 11/1996 |
| KR | 2000-0050717 | 8/2000 |

OTHER PUBLICATIONS

Randolph et al., Fingerprint Image Enhancement Using a Binary Angular Representation, May 7-11, 2001, Proceedings (ICASSP'01). 2001 IEEE International Conference on Acoustics, Speech and Signal Processing, 2001., vol. 3. pp. 1561-1564 vol. 3.*
Kamei et al., Image Filter Design for Fingerprint Enhancement, Nov. 21-23, 1995, International Symposium on Computer Vision, 1995. Proceedings,pp. 109-114.*

* cited by examiner

*Primary Examiner*—Matthew C. Bella
*Assistant Examiner*—Dennis Rosario
(74) *Attorney, Agent, or Firm*—Fitzpatrick, Cella, Harper & Scinto

(57) ABSTRACT

An image processing apparatus for processing a subject image signal obtained from a sensor has a first shading data generator, a second shading data generator, and a removal unit. The first shading data generator generates shading data from image signals obtained from at least two portions within the image signal obtained from the sensor. The second shading data generator generates shading data for the remaining portion of the sensor based on the shading data generated by the first shading data generator. The removal unit removes the shading data generated by the second shading data generator from the subject image signal of the remaining portion of the sensor.

5 Claims, 12 Drawing Sheets

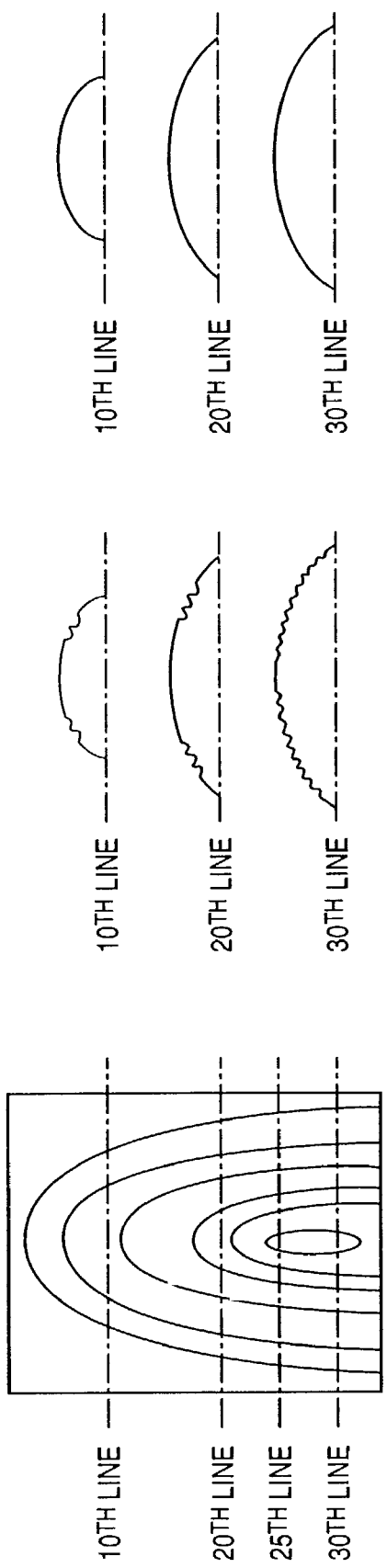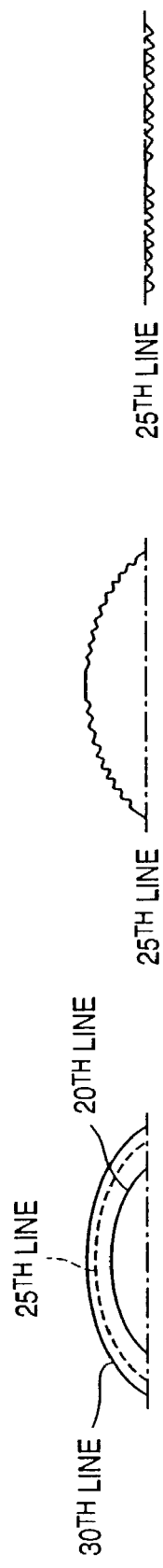
FIG. 4A  FIG. 4B  FIG. 4C
FIG. 4D  FIG. 4E  FIG. 4F

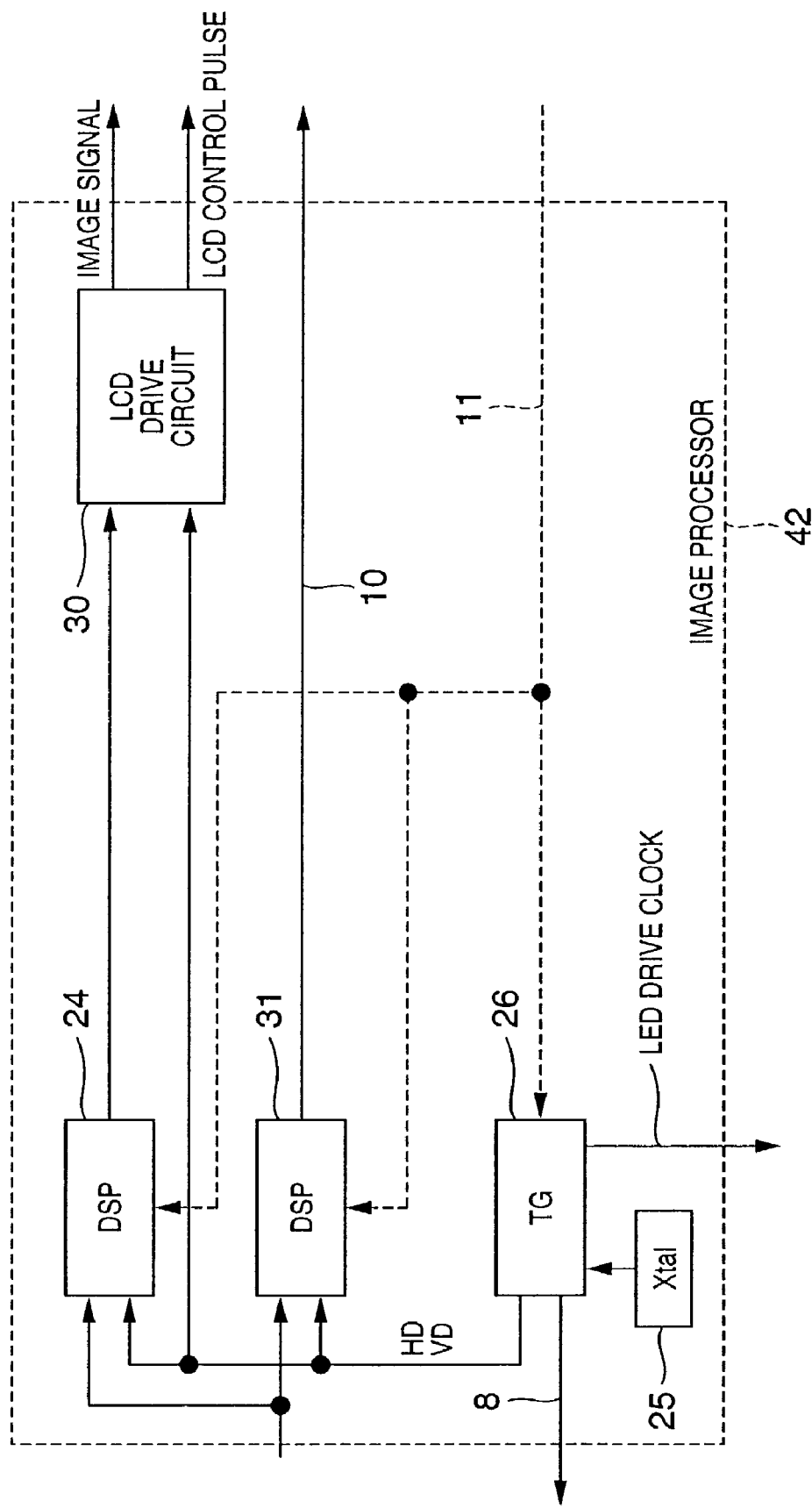

IMAGE PROCESSING APPARATUS AND METHOD

FIELD OF THE INVENTION

The present invention relates to an image processing apparatus and method, and more particularly, to an image processing apparatus mounted in a verification system used to, e.g., authenticate a live subject, and an image processing method.

BACKGROUND OF THE INVENTION

Conventionally, for example, an image processing apparatus is designed to read out every line of an image signal generated by a sensor in which a plurality of photoelectric converters are arrayed, so that a high-precision image can be formed by removing shading data from the read-out image signal.

For example, in an image authentication apparatus such as a scanner, more accurate authentication is achieved by removing non-uniformities, in other words shading, within the output unique to that apparatus using a correction circuit.

It should be noted that there are actually two types of shading. Specifically, there is dark shading due to photoelectric converter noise and unevenness in the dark output with respect to a reference level. Additionally, there is light shading due to the light source, the optical system and/or unevenness in the sensitivity of the photoelectric converters as well as the form and reflectivity of the subject.

In order to correct these types of shading, shading correction data is stored in the apparatus in advance as default values or shading correction data is produced by sensing a white reference member prior to a main image sensing operation.

However, a drawback of the conventional art is that the photoelectric converters produce shading data for all lines of the photoelectric converters, so it takes a great deal of time to produce the shading data when there are a large number of photoelectric converters.

Additionally, the above-described shading correction method requires a memory having a very large capacity in which to store the data needed for shading correction, particularly when correcting shading across the entire screen, increasing the number of calculations involved and thus increasing the scale of the circuitry and the cost as well.

Moreover, the conventional art suffers from the addition drawback that storing pre-set default correction values or acquiring a white reference member cannot correct for the uneven lighting that occurs in subject verification systems such as object recognition and fingerprint authentication systems due to the shape of the subject, its reflectivity, its positioning and ambient light conditions.

SUMMARY OF THE INVENTION

Accordingly, the present invention has been conceived against the above-described background, and has as its object to provide an apparatus and method for performing shading correction.

According to the present invention, the above-described object is attained by providing an image processing apparatus for processing an image signal obtained from a sensor containing a plurality of photoelectric converters arrayed two-dimensionally, the apparatus having: a first shading data generator adapted to generate shading data from image signals obtained from at least two portions within the subject image signal generated by the sensor; a second shading data generator adapted to generate shading data corresponding to the remaining portion of the sensor, based on the shading data generated by the first shading data generator; and a removing unit adapted to remove the shading data generated by the second shading data generator from the subject image signal obtained from the remaining portions of the sensor.

Additionally, the above-described object of the present invention is also attained by an image processing method for processing an image signal obtained from a sensor containing a plurality of photoelectric converters arrayed two dimensionally, the method having: a first shading data generating step of generating shading data from image signals obtained from at least two portions within the subject image signal generated by the sensor; a second shading data generating step of generating shading data corresponding to the remaining portion of the sensor, based on the shading data generated in the first shading data generating step; and a removing step of removing shading data generated in the second shading data generating step from the subject image signal obtained from the remaining portion of the sensor.

Additionally, the above-described object of the present invention is also attained by an image processing apparatus for processing an image signal obtained from a sensor containing photoelectric converters arrayed two dimensionally, the apparatus having: a shading data generator adapted to sequentially generate shading data by each predetermined unit from a subject image signal generated by the sensor; a removing unit adapted to remove the shading data generated by the shading data generator from the subject image signal generated by the sensor by each predetermined unit, based on an image signal of an immediately preceding predetermined unit.

Additionally, the above-described object of the present invention is also attained by an image processing method for processing an image signal obtained from a sensor containing a plurality of photoelectric converters arrayed two dimensionally, the method having: a shading data generating step of sequentially generating shading data by each predetermined unit from a subject image signal generated by the sensor; and a removal step of removing the shading data generated in the shading data generating step from the subject image signal generated by the sensor by each predetermined unit, based on an image signal of an immediately preceding predetermined unit.

Additionally, the above-described object of the present invention is also attained by an image processing apparatus for processing an image signal obtained from a sensor containing a plurality of photoelectric converters arrayed two-dimensionally, the apparatus having: a shading data generator adapted to generate shading data from a subject image signal generated by the sensor by suppressing a signal component within a predetermined frequency range; and a removal unit adapted to remove the shading data from the subject image signal generated by the sensor.

Additionally, the above-described object of the present invention is also attained by an image processing method for processing an image signal obtained from a sensor containing a plurality of photoelectric converters arrayed two-dimensionally, the method having: a shading data generating step of generating shading data from a subject image signal generated by the sensor by suppressing a signal component within a predetermined frequency range; and a removal step of removing the shading data from the subject image signal generated by the sensor.

Other objects, features and advantages of the present invention besides those discussed above shall be apparent to those skilled in the art from the description of a preferred embodiment of the invention which follows. In the description, reference is made to accompanying drawings, which form a part thereof, and which illustrate examples of the invention. Such examples, however, are not exhaustive of the various embodiments of the invention, and therefore reference is made to the claims that follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A, 4B, 4C, 4D, 4E and 4F are diagrams illustrating the processes performed by the DSP of FIG. 2;

FIG. 10 is a block diagram showing the internal structure of an image processor;

DETAILED DESCRIPTION OF THE PREFERRED EMBODIMENTS

Preferred embodiments of the present invention will be described in detail in accordance with the accompanying drawings.

First Embodiment

Figure 1:
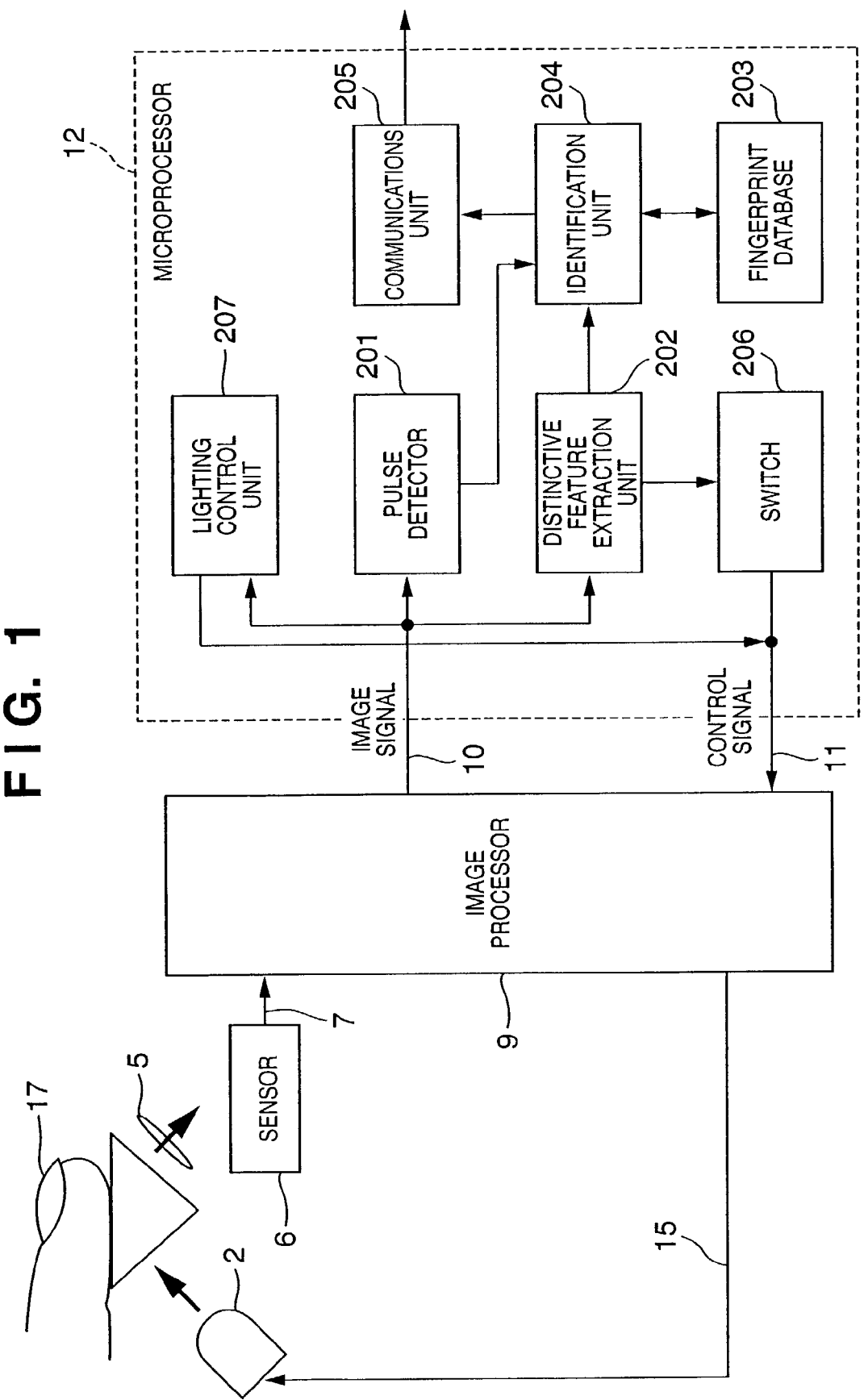
FIG. 1 is a block diagram showing the schematic structure of a fingerprint verification device according to a first embodiment of the present invention.

FIG. 1 is a block diagram showing the schematic structure of a fingerprint authentication apparatus according to a first embodiment of the present invention.

In FIG. 1, reference numeral 2 is a light-emitting diode (LED) that functions as a light source for illumination, 5 is a lens concentrating reflected light reflected from a finger 17, 6 is a sensor in which a plurality of photoelectric converters, which may be complementary metal-oxide semiconductor (CMOS)-type or charge coupled devices (CCDs), are arrayed two-dimensionally in ranks and rows, 7 is a signal line for transmitting image signals from the sensor 6, 9 is an image processor for processing the image signals transmitted from the sensor 6 via the signal line 7, 10 is a signal line for transmitting image signals from the image processor 9, 11 is a control line for controlling the image processor 9, 12 is a microprocessor for controlling the operation of the fingerprint authentication apparatus main unit, and 15 is a control line for controlling the amount of light emitted by the light-emitting diode (LED) 2.

In the microprocessor 12, reference numeral 201 is a pulse detector for detecting whether or not the object to be authenticated is a person's finger by checking for the presence of a change in the image signal due to a pulse. Reference numeral 202 is a distinctive feature extraction unit for extracting distinctive features such as the ridges in a fingerprint from the image signal. Reference numeral 204 is an identification unit that matches the positions of the distinctive features extracted by the distinctive feature extraction unit 202 against pre-registered fingerprints in a fingerprint database 203 when triggered by a determination by the pulse detector 201 that the image signal is a person's finger (more specifically a person's fingerprint). Reference numeral 205 is a communications unit for sending the results of the identification process performed by the identification unit 204 to a host computer or the like via the internet or the like. Reference numeral 206 is a switch for switching from low resolution to high resolution when the distinctive feature extraction unit 202 is unable to adequately extract the distinctive features of the subject. Reference numeral 207 is a lighting control unit for controlling the amount of light emitted by the LED 2, based on the image signal.

It should be noted that the photoelectric converters of the sensor 6 may be arrayed in virtually any pattern provided that a plurality of photoelectric converters are arrayed in two dimensions. Thus, the photoelectric converters may be arrayed in a matrix arrangement, a honeycomb arrangement or a delta arrangement.

Figure 2:
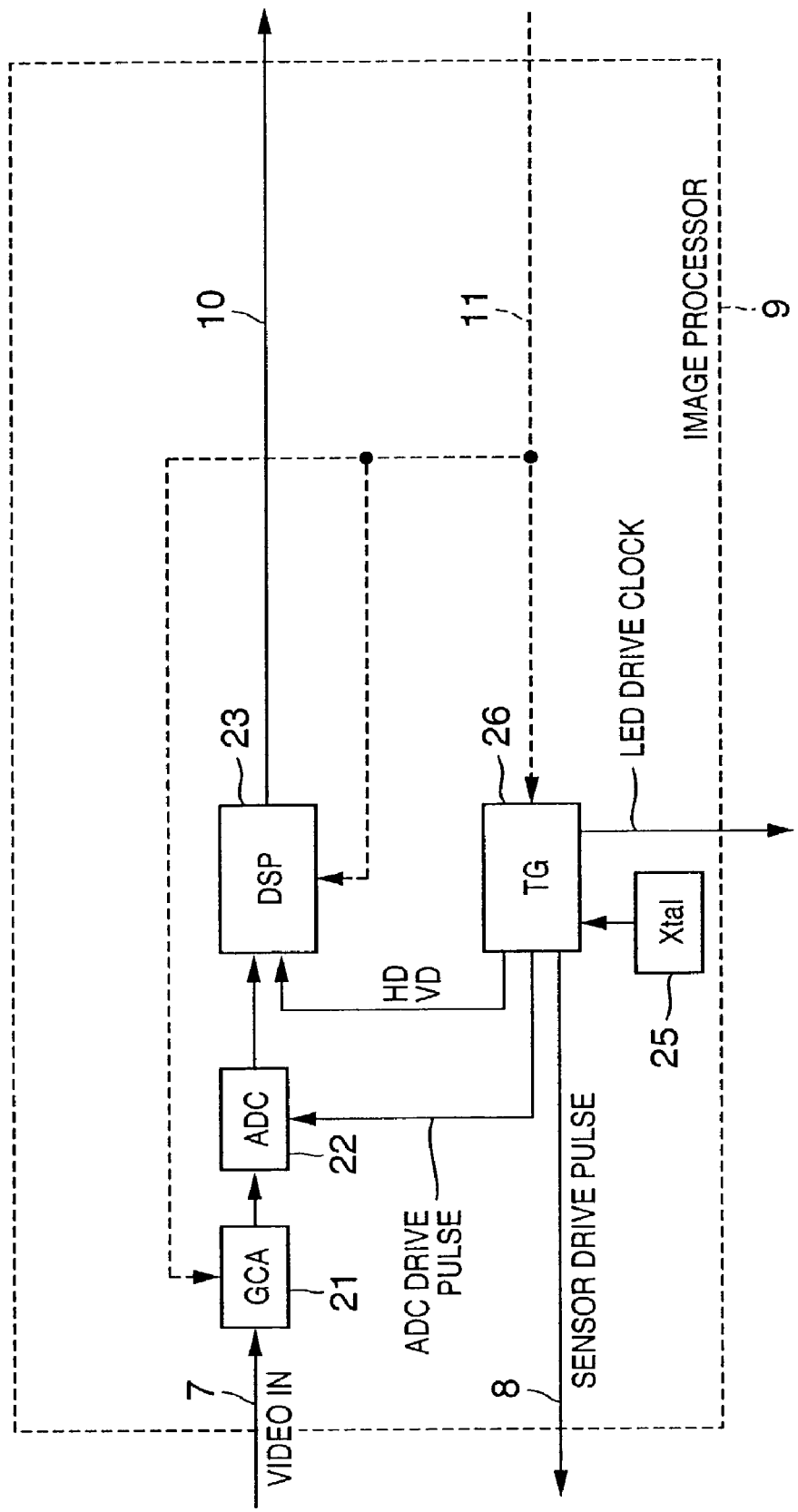
FIG. 2 is a block diagram showing the internal structure of the image processor of FIG. 1.

FIG. 2 is a block diagram showing the internal structure of the image processor 9 of FIG. 1. In FIG. 2, reference numeral 21 is a gain control amp (GCA) for adjusting the gain of the image signal input through the signal line 7, reference numeral 22 is an analog digital converter (ADC) for converting the output of the CGA 21 from an analog signal to a digital signal, reference numeral 23 is a digital signal processor for processing the image signal output from the ADC 22, reference numeral 25 is crystal oscillator (Xtal) for generating a clock, reference numeral 26 is a timing generator (TG) that generates a variety of drive pulses to the sensor 6, the ADC 22, the digital signal processor 23 and the like, based on the clock from the liquid crystal oscillator 25.

Figure 3:
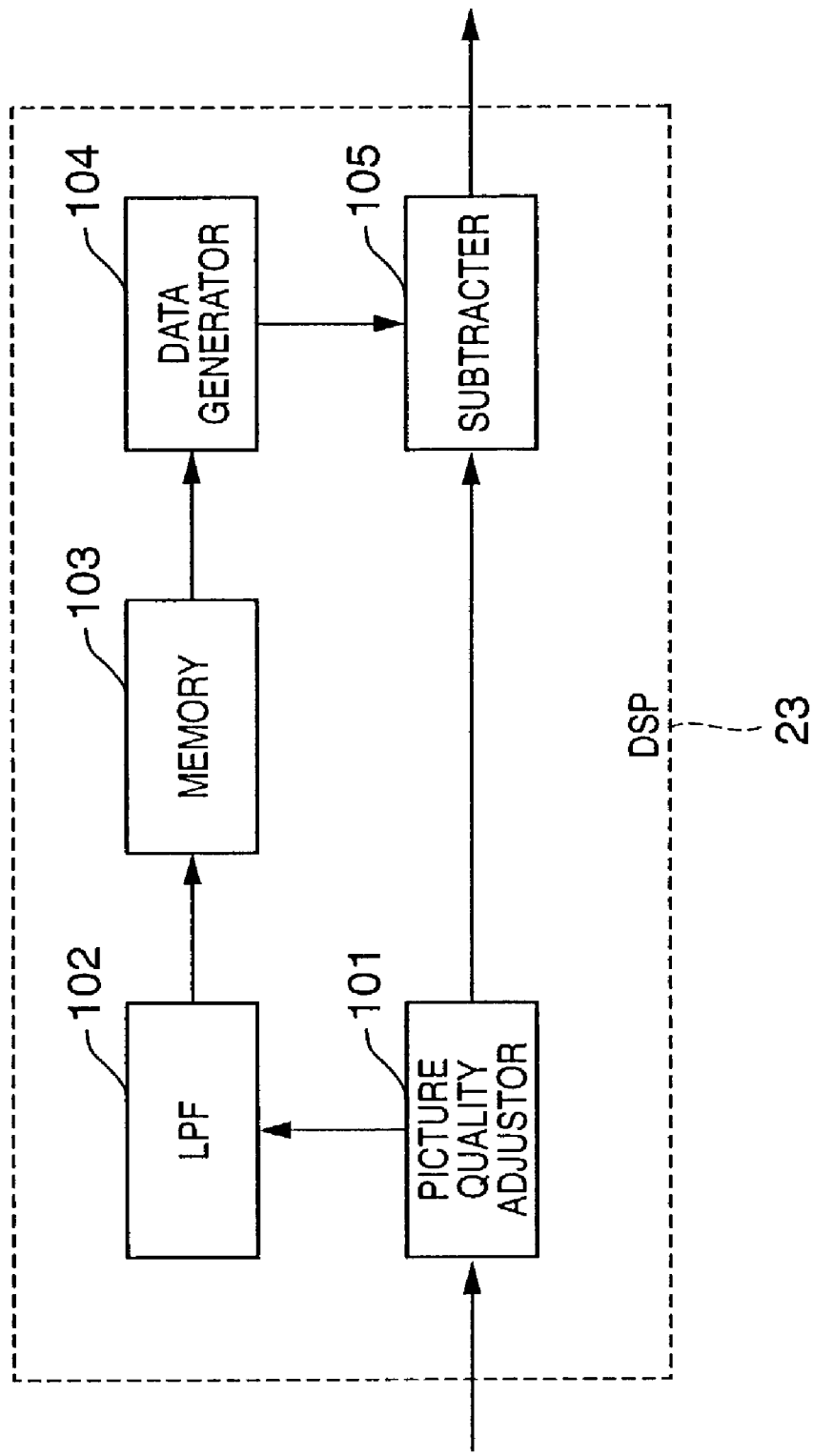
FIG. 3 is a block diagram showing the internal structure of the digital signal processor (DSP) of FIG. 2.

FIG. 3 is a block diagram showing the internal structure of the digital signal processor DSP 23 of FIG. 2. FIGS. 4A, 4B, 4C, 4D, 4E and 4F are diagrams illustrating the processes performed by the DSP 23 of FIG. 2. In FIG. 3, reference numeral 101 is a picture quality adjustor that performs digital image processing such as contrast adjustment and γ conversion on the image signal of the fingerprint of a finger 17 such as that shown IN FIG. 4A, reference numeral 102 is a low-pass filter (LPF) that extracts (FIG. 4B) image signals of a predetermined plurality of portions of the photoelectric converters from the image signal shown in FIG. 4A (for example, lines 10, 20, 30, etc.) and removes a high-frequency component from the image signal, so as to remove the subject image component and generate shading data, reference numeral 103 is a memory for storing the output from the LPF 102, and reference numeral 104 is a data generator for producing the image signals corresponding to the photoelectric converters of that portion other than the predetermined plurality of portions noted above (in other words, the remaining portion of photoelectric converters)

using the shading data stored in the memory 103. The data generator 104, when producing shading data from line 25 (for example), does so by generating an average signal (FIG. 4D) of the image signals of the photoelectric converters of the $20^{th}$ line and the photoelectric converters of the $30^{th}$ line. Reference numeral 105 is a substracter for removing shading and generating an image signal (FIG. 4F) of the ridges of the fingerprint of the finger 17 by subtracting the data generator 104 output signal from the image signal actually output (FIG. 4E) from the photoelectric converters.

This shading is not just shading due to photoelectric converters noise and unevenness in dark output with respect to a reference level, but also includes light shading due to the light source, the optical system and/or unevenness in the sensitivity of the photoelectric converters as well as the form and reflectivity of the subject.

With a fingerprint authentication unit like that of the first embodiment, there is some slight rotation even where the user is instructed as to the direction in which to rest the finger. Additionally, a finger is not a perfect cylinder, but has a thickness that varies along its length. Additionally, fingers naturally vary by age and sex generally and there is individual variation within these categories as well. Additionally, the shape of the finger varies depending on the way the finger is placed on the pad as well as which portion is placed. As a result, differences in light levels due to the shape and reflectivity of the subject, positioning and ambient lighting change the conditions of the authentication.

Figure 5A:
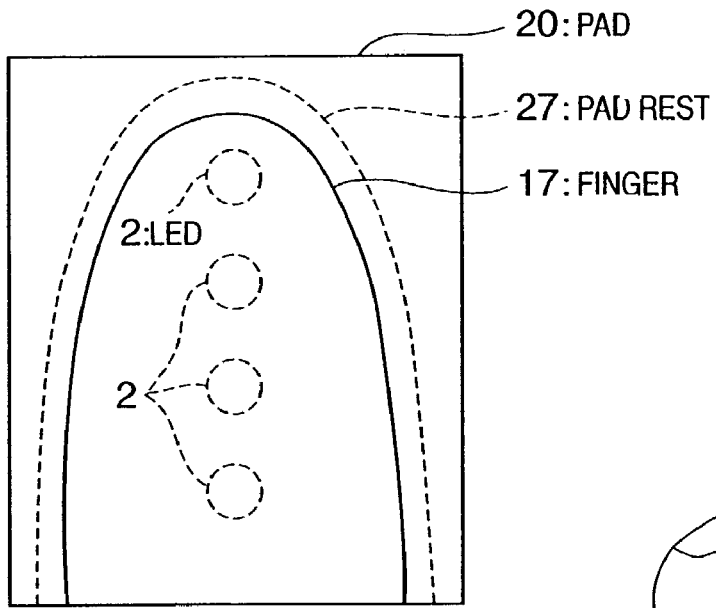
FIGS. 5A, 5B and 5C are diagrams illustrating the relative placement of the pad on which a finger is laid and LEDs.
Figure 5B:
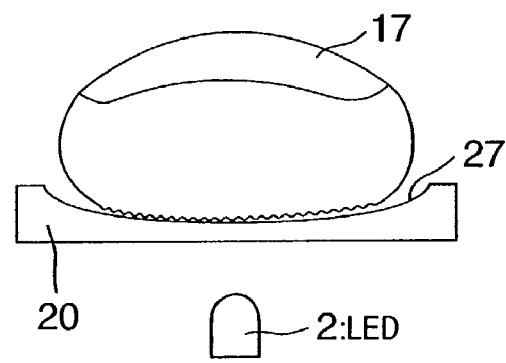
Figure 5C:
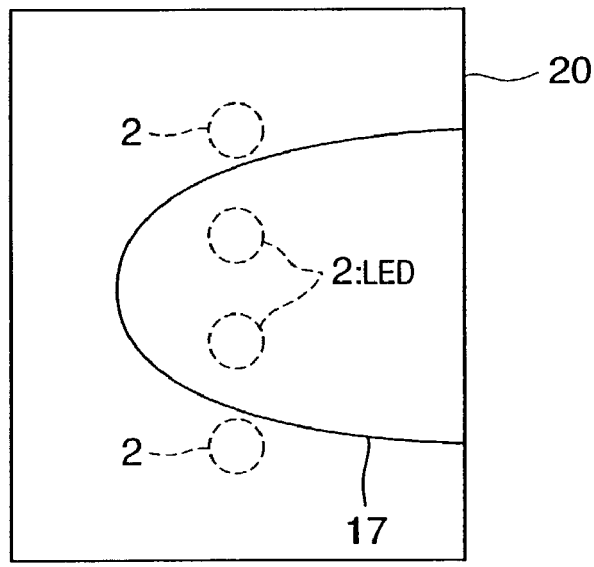

FIGS. 5A, 5B and 5C are diagrams illustrating the relative placement of the pad on which a finger is laid and the LEDs. FIG. 5A is a surface view of a finger placed on the pad 20. FIG. 5B is a cross-sectional view of FIG. 5A. As shown in FIG. 5A, the LEDs 2 are arranged for example in a line, and the pad 20 is designed so that the direction in which the LEDs are aligned and the longer axis of the finger 17 coincide. The pad 20 may also have a pad rest 27 that is raised above the surface in the shape of a finger, in order to facilitate the correct positioning of the finger 17 along the line of the LEDs.

The first embodiment of the present invention is characterized by the production, by interpolation from the shading data of two other lines using correlativity, of shading data superimposed on every line of data due to the shape and reflectivity of the subject, its position, and ambient lighting.

Accordingly, where the apparatus is not designed to ensure the direction of alignment of the LEDs and the longer axis of the finger 17, as illustrated, for example, in FIG. 5C, in which the finger 17 is laid perpendicular to the direction of alignment of the LEDs 2, it is sometimes not possible to obtain an image signal with a fully adequate correlation of shading. Hence, such an arrangement is not desirable. Accordingly, designing the pad 20 in the manner described above with respect to the first embodiment ensures that a sufficient amount of light emitted from the LEDs 2 illuminates the subject finger 17 for easy acquisition of clear image signals.

Figure 6:
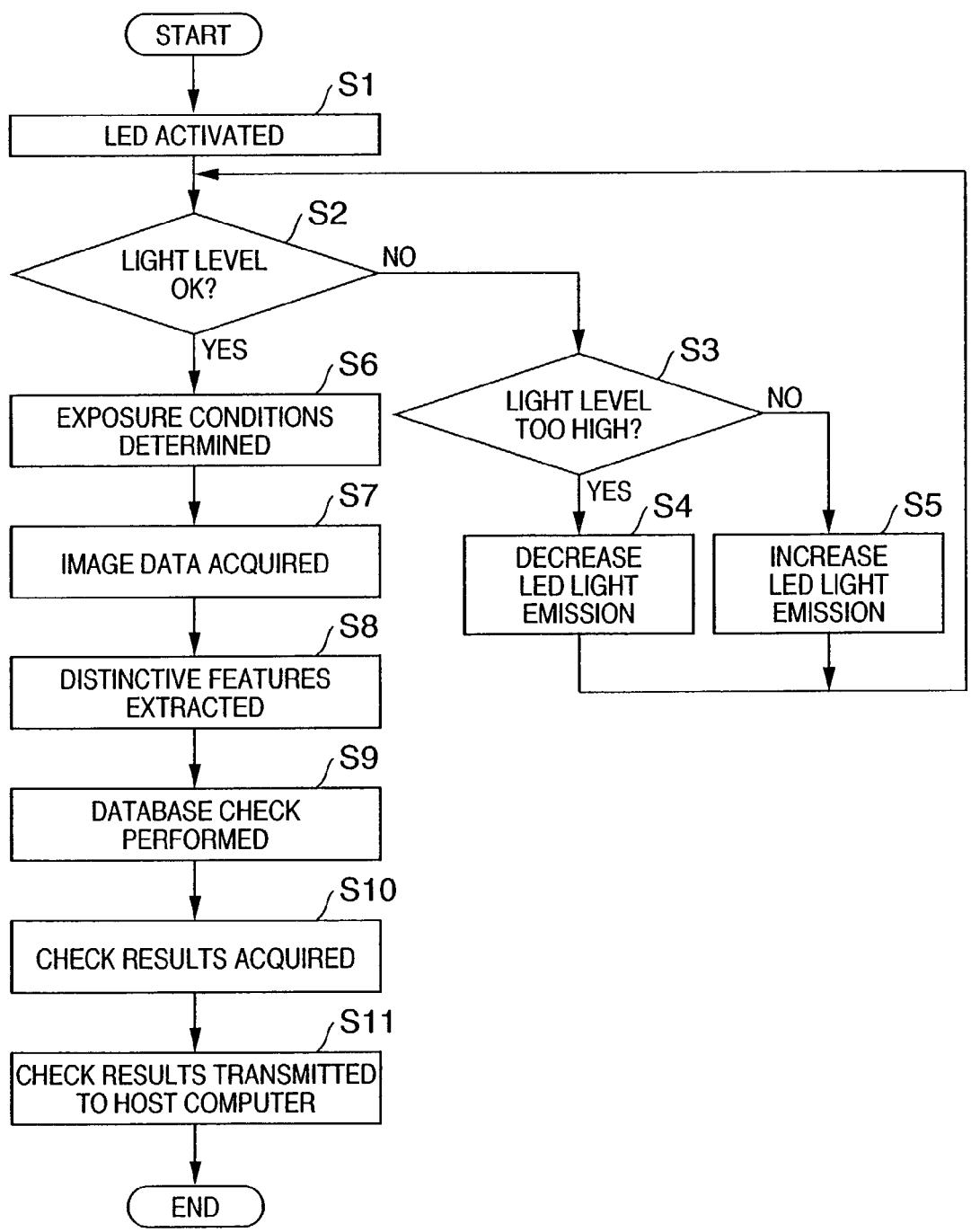
FIG. 6 is a flow chart illustrating the operation of the fingerprint authentication apparatus shown in FIG. 1.
Figure 7:
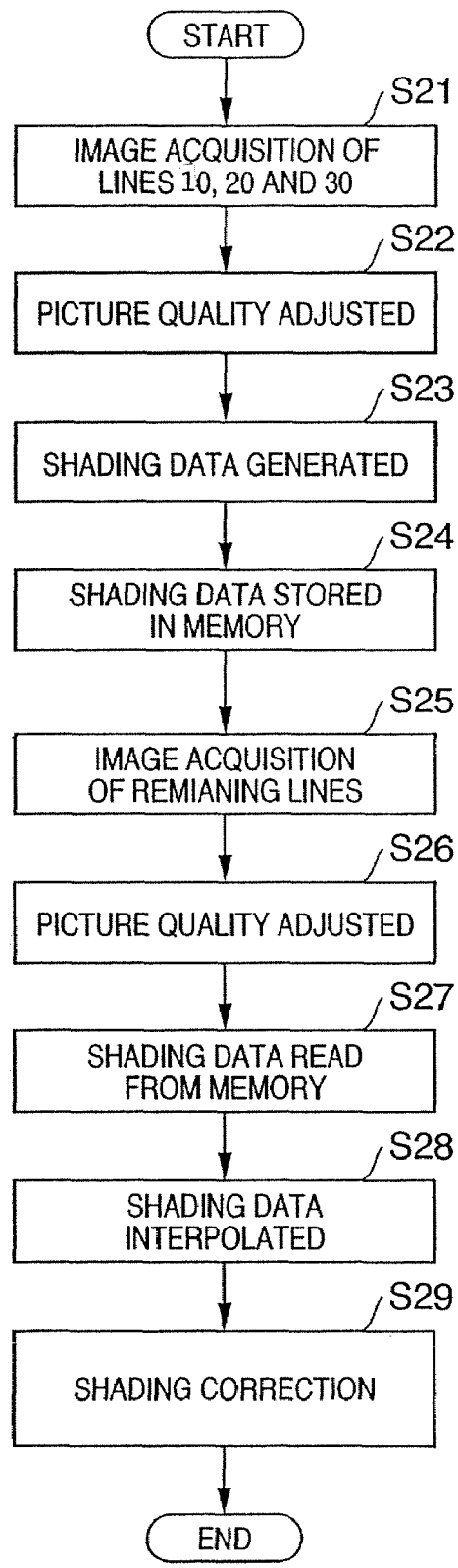
FIG. 7 is a flow chart showing the operations performed in step S7 of FIG. 6.

FIG. 6 is a flow chart illustrating the operation of the fingerprint authentication apparatus shown in FIG. 1. FIG. 7 is a flow chart showing the operations performed in step S7 of FIG. 6.

In the following description, it is assumed that, for purposes of illustration only, the fingerprint authentication apparatus of FIG. 1 is mounted in a mobile communications device such as a cellular telephone or the like, and that such cellular telephone is used to conduct electronic trading of securities, with authentication at settlement being conducted using the fingerprint authentication apparatus.

As an initial matter, the LEDs 2 are activated in a step S1 by an activation command transmitted from the image processor 9 via the control line 15.

The finger 17 placed on the pad 20 is then illuminated by light emitted from the LEDs 2. The light reflected from the finger 17 is concentrated by the lens 5 onto the sensor 6. The sensor 6 then converts this reflected light into an electrical signal and then transmitted to the image processor 9 via the signal line 7. At the image processor 9, the input image signal is processed and then output to the microprocessor 12.

In a step S2, at the microprocessor 12, the lighting control unit 207 determines whether or not the level of light emitted by the LEDs 2 is appropriate, based on the input signal.

If as a result of the determination made in step S2 described above the lighting control unit 207 determines that the brightness and contrast of the image of the fingerprint 17 are sufficient to acquire an image of the fingerprint, then the process proceeds directly to a step S6, and if not, the process proceeds to a step S3.

In a step S3, the lighting control unit 207 determines whether or not the level of light emitted by the LEDs 2 is greater than that required to decode the image of the finger 17.

If in step S3 the lighting control unit 207 determines that the level of light emitted from the LEDs is greater than that required to decode the image of the finger 17, then the lighting control unit 207 sends a control signal to the image processor 9 to decrease the brightness of the LEDs 2 in steps. In a step S4, the image processor 9 follows this signal and decreases the amount of light emitted by the LEDs 2.

Conversely, if in step S3 the lighting control unit 207 determines that the level of light emitted from the LEDs is less than that required to decode the image of the finger 17, then the lighting control unit 207 sends a control signal to the image processor 9 to increase the brightness of the LEDs 2 in steps. In a step S5, the image processor 9 follows this signal and increases the amount of light emitted by the LEDs 2.

It should be noted that, instead of adjusting the amount of light emitted by the LEDs 2, the gain when the GCA 21 performs gain control of the image signal can be adjusted. In that case, exposure conditions can be set when the amount of light emitted by the LEDs 2 is optimal, in a step S6.

Thereafter, when adjustment of the amount of light is finished, the process proceeds to a step S3, the finger 17 is sensed under the required lighting conditions and, in a step S7, the image data is acquired. A more detailed description will now be given of the image data acquisition process carried out in step S7.

The read image signals are digitally processed (brightness, contrast, tone, etc,) by the picture quality adjustor 101 in a step 322, and are provided as an output in the form depicted in FIG. 4B.

Then, in a step S23, shading data for the read image signals is generated by the LPF 102, and is provided as an output as depicted in FIG. 4C.

The generated shading data is stored in the memory 103 in a step S24.

Next, image signals of photoelectric converters for lines other than lines 10, 20 and 30 are read out, one line at a time, in a step S25, and applied to the picture quality adjustor 101. For Example, the input from the $25^{th}$ line is depicted in FIG. 4E. The read out image signals are then digitally processed (brightness, contrast, tone, etc.) by the picture quality adjustor 101 in a step S26.

Then, the shading data held in the memory 103, is read out in a step S27.

The read out shading data is then output to the data generator 104. In a step S28, the data generator 104 then produces shading data corresponding to a line read in step S25, in the way described with reference to FIG. 4D above. The shading data so generated is then sent to the subtracter 105. The picture quality-adjusted image data read out in step S25 is then input to the subtracter 105, with the produced shading data subtracted from the image signal by the data generator 104 in a step S29.

Then an image signal of the ridges of the finger 17 is generated, without generating shading data of the image signals of the photoelectric converters of those lines other than lines 10, 20 and 30 as described above based on image signals read out at every line. For example, the output for the 25$^{th}$ line is depicted in FIG. 4F.

It should be noted that, once the image signal has been read from the sensor 6 and adjusted by the picture quality adjustor 101, thereafter several such image signals may be transmitted to the LPF 102. In other words, steps S21 and S25 can be combined, as can steps S22 and S25.

Then, the shading data-corrected image signal is sent to the microprocessor 12 in a sequence like identical to that of step S1. The microprocessor 12 then outputs the acquired finger image to both the pulse detector 201 and the distinctive feature extraction unit 202 at the same time.

The pulse detector 201 determines if the object to be authenticated is a person's fingerprint based on the presence or absence of changes in the image signal due to a pulse, and outputs the results of the detection to the identification unit 204. The distinctive feature extraction unit 202 extracts distinctive features such as the ridges of the fingerprint from the image signal, which are then output to the identification unit 204 in a step S8.

The identification unit 204 then identifies (authenticates) the fingerprint by referencing a database 203 based on the relative positions of the distinctive features acquired from the distinctive feature extraction unit 202 in a step S9.

As described above, an authentication report is acquired in a step S10.

In a step S11, the acquired authentication results are transmitted to the host computer which is the seller of the product via a communications unit 205, together with the detection results from the pulse detector 201.

Ultimately, at the host computer thus supplied with the authentication results described above, the fingerprint is authenticated, at which point (for example) the purchase amount is withdrawn from the bank account of the purchaser, the bank account number being previously provided to the seller by the buyer.

It should be noted that the sensor 6 and the picture quality adjustor 101, the memory 103 and the subtracter 105 may all be placed on a single chip. In particular, placing all such components on a single chip allows the main unit to be made more compact, which is desirable in the case of mobile communications devices such as cellular telephones, personal data assistants (PDAs) and the like, in which a premium is placed on portability.

Second Embodiment

Figure 8:
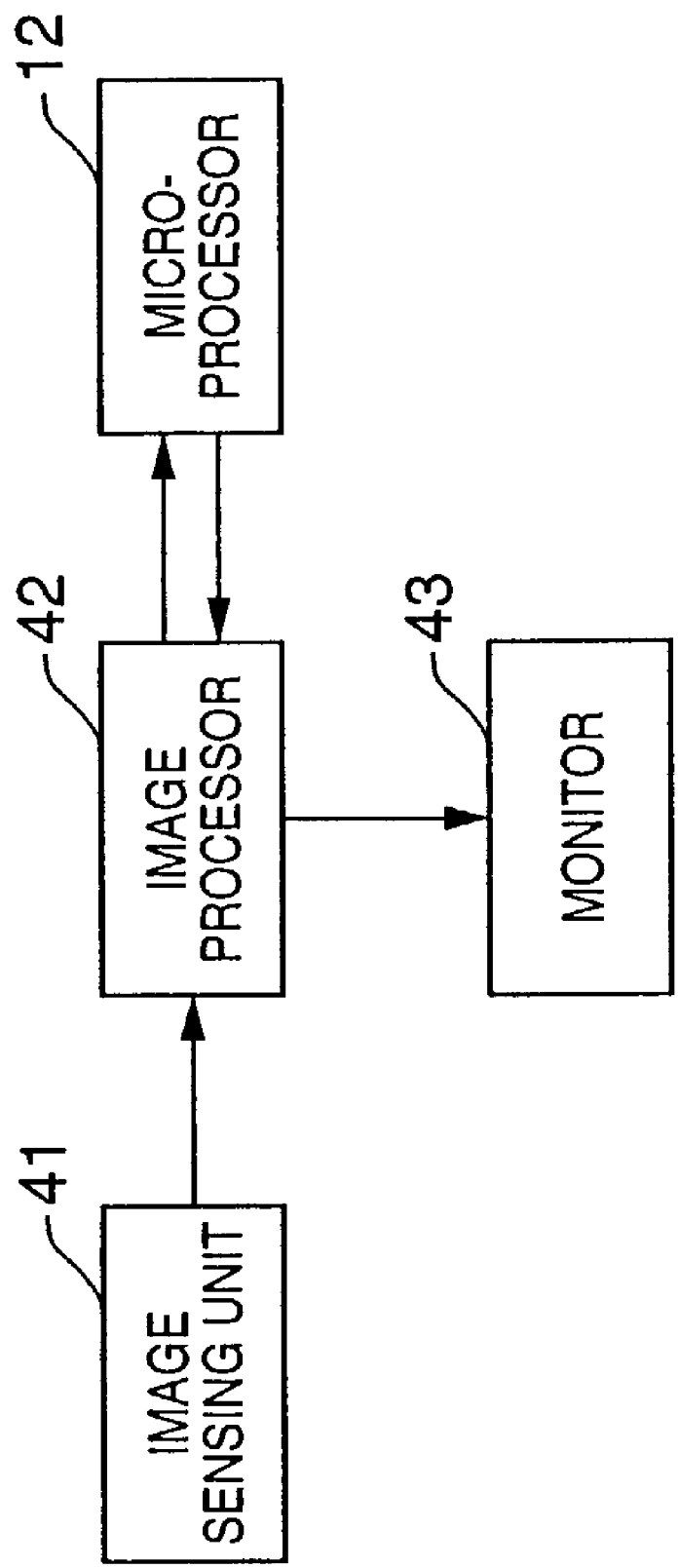
FIG. 8 is a block diagram showing a schematic structure of an image processing apparatus according to a second embodiment of the present invention.

FIG. 8 is a block diagram showing a schematic structure of an image processing apparatus according to a second embodiment of the present invention.

In FIG. 8, reference numeral 41 denotes an image sensing unit that combines on a single chip the sensor 6 and the GCA 21 and the ADC 22 of the image processor 9 of FIG. 1, the picture quality adjustor 101, the memory 103, the data generator 104 and the subtracter 105. Reference numeral 42 denotes an image processor for processing image signals output from the image sensing unit 41, and reference numeral 43 is a monitor for displaying the image processed by the image processor 9. It should be noted that, in FIG. 8, parts identical to those shown in FIG. 1 are given the same reference numeral.

Figure 9:
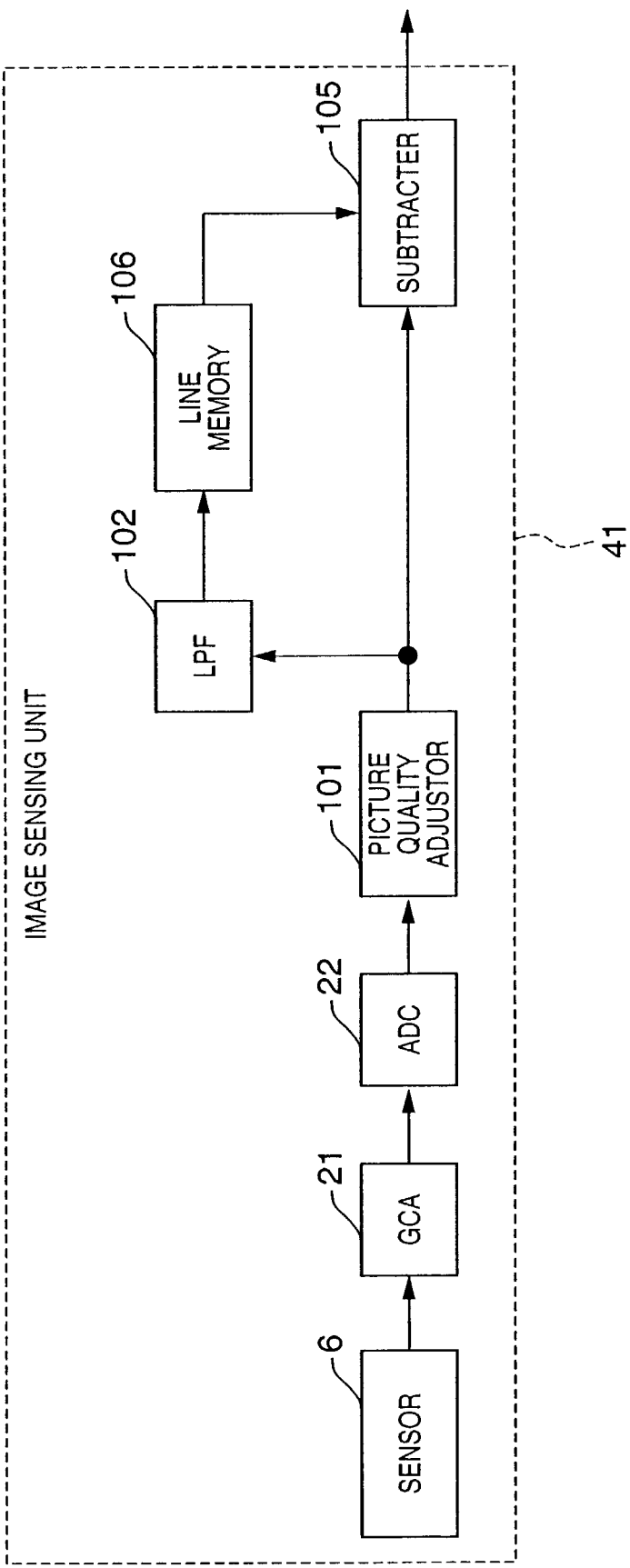
FIG. 9 is a block diagram showing the internal structure of a photographic unit.

FIG. 9 is a block diagram showing the internal structure of the image sensing unit 42.

In FIG. 9, reference numeral 106 is a line memory that stores shading data produced by the data generator 104. It should be noted that, in FIG. 9, parts identical to those shown in FIG. 1 are given the same reference numeral.

FIG. 10 is a block diagram showing the internal structure of an image processor 42.

In FIG. 10, reference numerals 24 and 31 denote DSPs that digitally process signals output from the image sensing unit 41, performing contrast adjustment and γ conversion. Reference numeral 30 is an LCD drive circuit that sends image signals and the like to the monitor 43. It should be noted that, in FIG. 10, parts identical to those shown in FIG. 1 are given the same reference numeral.

Figure 11A:
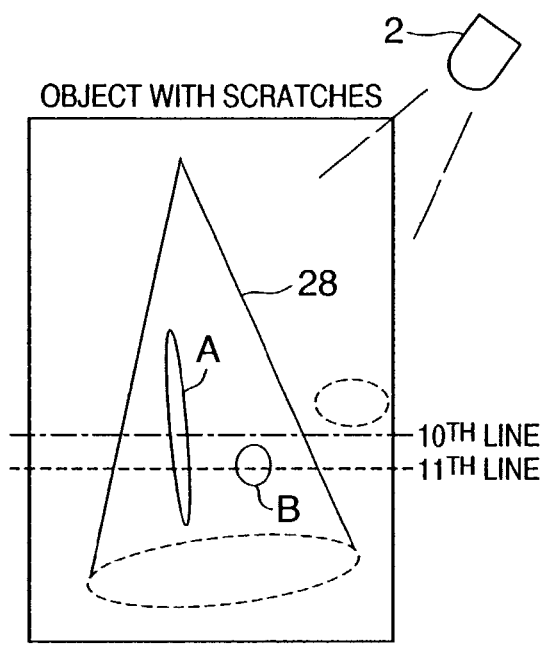
FIGS. 11A, 11B, 11C and 11D are diagrams illustrating the shading correction performed on an image signal of an object having scratches A and B when the object is illuminated by light from an LED.
Figure 11B:
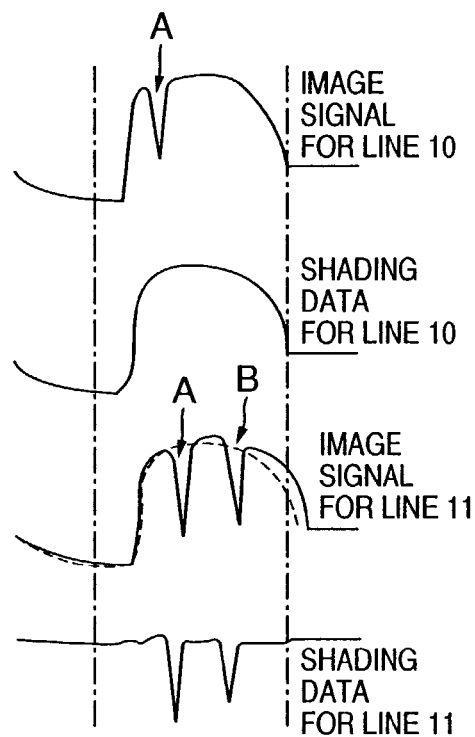

FIGS. 11A, 11B, 11C and 11D are diagrams illustrating the shading correction performed on an image signal of an object having scratches A and B when the object is illuminated by light from an LED. More specifically, FIG. 11A shows a state in which the object 28 having scratches A and B illuminated by light from the LEDs 2. FIG. 11B shows image signals and shading data of the photoelectric converters of lines 10 and 11.

In the second embodiment described above, the shading correction data for the shading superimposed on every line of image data due to the shape and reflectivity of the subject, its position, and ambient lighting is produced from the shading data of the immediately preceding line using correlativity.

Figure 11C:
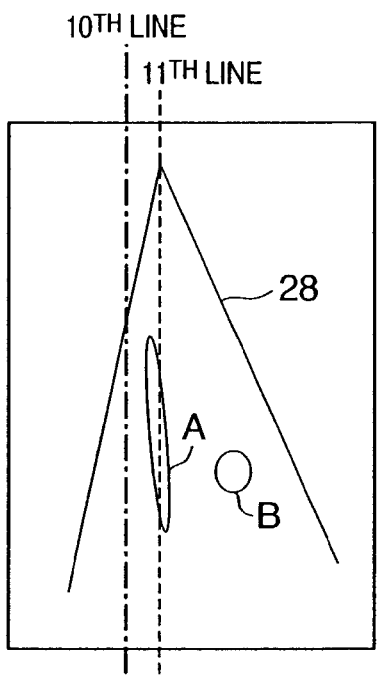
Figure 11D:
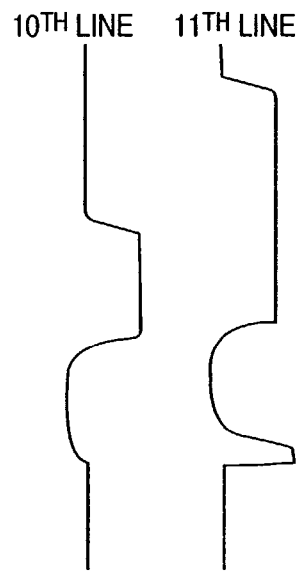

Accordingly, positioning the object 28 without reference to the shape of the object 28 and ambient lighting conditions as shown in FIG. 11C results in degraded correlativity and a state in which only an image signal like that shown in FIG. 11D can be obtained. Thus, the object 28 should be positioned as shown in FIG. 11A.

Figure 12:
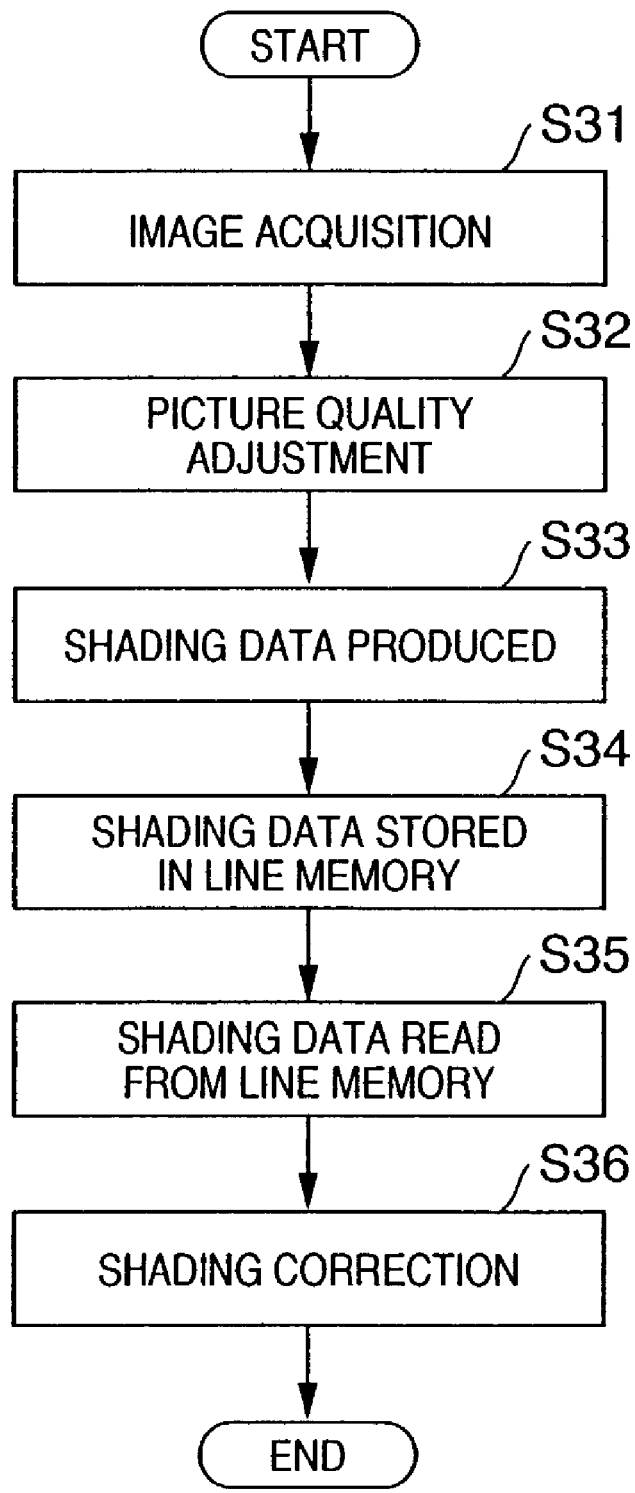
FIG. 12 is a flow chart illustrating the operation of the image sensing unit of the second embodiment of the present invention.

FIG. 12 is a flow chart illustrating the operation of the image sensing unit 41 of the second embodiment of the present invention shown in FIG. 9. As with the first embodiment, the LEDs 2 are triggered, the light reflected from the object 28 is concentrated on the sensor 6 and an image signal is acquired in a step S31.

Next, in a step S32, the image signal is read from the sensor 6 sequentially, one line at a time, with gain control being performed thereon by the GCA 21 and the signal converted from an analog signal to a digital signal by the ADC 22, after which the picture quality adjustor 101 digitally processes the image for brightness, contrast and tone.

In a step S33, shading data for the image signal read out sequentially is generated by the LPF 102.

The shading data so generated is then stored in a line memory 106 in a step S34.

The shading data so stored is then synchronized with the readout from the sensor 6 of the image signal of the succeeding line and input to the subtracter 105.

In a step S36, shading correction is performed inputting the image signal sequentially adjusted by the picture quality adjustor 101 to the subtracter 105, so that, for example, the shading data for a line n is subtracted from the image signal of line n+1.

By producing shading data from the image signal of the preceding line as described above, an image signal of the object 28 can be generated without the need for frame memory or large-scale circuitry.

The present invention can also accommodate the uneven lighting that is typical of verification systems due to the fact that the shape of the subject, its reflectivity, its positioning and ambient light conditions change with each authentication, in other words changes in shading, because shading correction data is continuously being produced from the data of the immediately preceding line.

An image signal that has been shading corrected by the process illustrated in FIG. 12 is passed through the LCD drive circuit 30 as per instructions from the microprocessor 12 and either displayed on the monitor 43 or output externally through a connecting line not shown in the diagram.

As described above, because the circuitry scale and costs can be reduced the present invention can achieve a low-cost, compact image processing apparatus.

Additionally, the present invention can be adapted to correct for the uneven lighting that is typical of verification systems (such as objection recognition and fingerprint authentication systems) because the shape of the subject, its reflectivity, its positioning and ambient light conditions change with each authentication.

Third Embodiment

Those of ordinary skill in the art can appreciate that the present invention is not limited to the first and second embodiments described above but may be any configuration that removes a high-frequency signal component corresponding to a fingerprint and generates shading data based on an image signal that includes the fingerprint, uneven lighting and the like. Thus, for example, the data generator 104 of the first and second embodiments may be eliminated and shading data for all lines stored in the memory 103.

As described above, according to the first, second and third embodiments, by suppressing signal components of a predetermined frequency component of, e.g., a fingerprint image from image signal of a subject generated by the sensor 6, appropriate shading correction can be carried out by providing a shading data generator such as an LPF and the like that generates shading data and a subtracter 105 that removes the shading data from the subject image signal generated by the sensor 6.

Other Embodiments

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and LAN, can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts in FIGS. 6 and 7, or the flowchart in FIG. 12 described in the embodiments.

The present invention is not limited to the above embodiments and various changes and modifications can be made within the spirit and scope of the present invention. Therefore to apprise the public of the scope of the present invention, the following claims are made.

What is claimed is:

1. A fingerprint authentication apparatus for processing image signals of a finger read out from a sensor containing a plurality of photoelectric converters arrayed two dimensionally and producing first, second, and third image signals of a plurality of lines of pixels comprising first and second sets of lines of pixels that are different from each other, the apparatus comprising:

a low-pass filter receiving the first set of lines of the first image signal of the finger and being configured:
to remove the portion of the first set of lines of the image signal representing fingerprint ridges; and
to transmit therethrough a shading-noise signal component of the first set of lines of the image signal comprising:
dark shading noise comprising photoelectric converter noise and/or unevenness in the dark output of the photoelectric converters with respect to a reference level, and/or
light-shading noise comprising uneven-lighting noise resulting from unevenness in the luminance of the image signals due to the form and reflectivity of the finger, a light source illuminating the finger, an optical system imaging an image of the finger, and/or unevenness in the sensitivity of the photoelectric converters to light reflected by the finger,
the low-pass filter being configured to extract from the first set of lines of the first image signal of the finger obtained by the sensor, the shading-noise signal component having a frequency range lower than a predetermined frequency, the predetermined frequency being lower than a frequency capable of expressing fingerprint ridges;
a shading data generator configured
to receive the shading-noise signal component of the first set of lines of the first image signal, and
to generate, by interpolating between the first set of lines of the extracted shading-noise signal component of the first image signal of the finger, a shading-noise signal component of the second set of lines of the second image signal of the finger comprising:
   dark shading noise comprising photoelectric converter noise and/or unevenness in the dark output of the photoelectric converters with respect to a reference level; and/or
   light-shading noise comprising uneven-lighting noise resulting from unevenness in the luminance of the image signals due to the form and reflectivity of the finger, a light source illuminating the finger, an optical system imaging an image of the finger, and/or unevenness in the sensitivity of the photoelectric converters to light reflected by the finger;
a removing unit configured to subtract from the third image signal of the finger obtained by the sensor not having passed through the low-pass filter or the shading data generator, the shading-noise signal component of the second set of lines of the second image signal generated by said shading data generator, and to output a difference image signal; and
a verification unit configured to match the difference image signal output from said removing unit with a pre-stored image signal.

2. The apparatus according to claim 1, further having a picture quality adjustor configured to adjust the picture quality of the subject image signals.

3. An image processing method for processing image signals of a finger read out from a sensor containing a plurality of photoelectric converters arrayed two dimensionally and producing first, second, and third image signals of a plurality of lines of pixels comprising first and second sets of lines of pixels that are different from each other, the method comprising:
   a low-pass filtering step of:
      receiving the first set of lines of the first image signal of the finger;
      filtering and removing the portion of the first set of lines of the image signal representing fingerprint ridges;
      transmitting a shading-noise signal component of the first set of lines of the image signal comprising:
         dark shading noise comprising photoelectric converter noise and/or unevenness in the dark output of the photoelectric converters with respect to a reference level, and/or
         light-shading noise comprising uneven-lighting noise resulting from unevenness in the luminance of the image signals due to the form and reflectivity of the finger, a light source illuminating the finger, an optical system imaging an image of the finger, and/or unevenness in the sensitivity of the photoelectric converters to light reflected by the finger, and
      extracting from the first set of lines of the first image signal of the finger obtained by the sensor, a shading-noise signal component having a frequency range lower than a predetermined frequency, the predetermined frequency being lower than a frequency capable of expressing fingerprint ridges;
   a shading data generating step of generating by interpolating between the first set of lines of the extracted shading-noise signal component of the first image signal, a shading-noise signal component of the second set of lines of the second image signal of the finger comprising:
      dark shading noise comprising photoelectric converter noise and/or unevenness in the dark output of the photoelectric converters with respect to a reference level; and/or
      light-shading noise comprising uneven-lighting noise resulting from unevenness in the luminance of the image signals due to the form and reflectivity of the finger, a light source illuminating the finger, an optical system imaging an image of the finger, and/or unevenness in the sensitivity of the photoelectric converters to light reflected by the finger;
   a removal step of subtracting from the third image signal of the finger obtained by the sensor not having been processed by said low-pass filter step or the shading data generator step, the shading-noise signal component of the second set of lines of the second image signal generated in said shading data generating step to generate a difference image signal and
   a verification step of matching the difference image signal obtained in said removing step with a pre-stored image signal.

4. A fingerprint authentication apparatus for processing image signals of a finger read out from a sensor containing a plurality of photoelectric converters arrayed two dimensionally, the apparatus comprising:
   a low-pass filter receiving at least a part of an image signal of the finger and being configured:
      to remove the portion of the part of the image signal representing fingerprint ridges; and
      to transmit therethrough only a shading-noise signal component of the part of the image signal comprising at least one of:
         dark shading noise comprising photoelectric converter noise and/or unevenness in the dark output of the photoelectric converters with respect to a reference level, and
         light-shading noise comprising uneven-lighting noise resulting from unevenness in the luminance of the image signals due to the form and reflectivity of the finger, a light source illuminating the finger, an optical system imaging an image of the finger, and/or unevenness in the sensitivity of the photoelectric converters to light reflected by the finger,
      the low-pass filter being configured to extract from the at least a part of the image signal of the finger obtained by the sensor, the shading-noise signal component having a frequency range lower than a predetermined frequency, the predetermined frequency being lower than a frequency capable of expressing fingerprint ridges;
   a shading data generator configured
      to receive the shading-noise signal component of the image signal, and
      to generate, from the extracted shading-noise signal component of the at least a part of the image signal of the finger, a shading-noise signal component of another image signal of the finger comprising at least one of:
         dark shading noise comprising photoelectric converter noise and/or unevenness in the dark output of the photoelectric converters with respect to a reference level; and
         light-shading noise comprising uneven-lighting noise resulting from unevenness in the luminance of the image signals due to the form and reflectivity of the finger, a light source illuminating the finger, an optical system imaging an image of the finger, and/or unevenness in the sensitivity of the photoelectric converters to light reflected by the finger;

a removing unit configured to subtract from an image signal of the finger obtained by the sensor, not having passed through the low-pass filter or the shading data generator, the shading-noise signal component generated by said shading data generator, and to output a difference image signal; and a verification unit adapted to match the difference image signal output from said removing unit with a pre-stored image signal.

5. An image processing method for processing image signals of a finger read out from a sensor containing a plurality of photoelectric converters arrayed two dimensionally, the method comprising:

a low-pass filtering step of:
  receiving at least a part of an image signal of the finger;
  removing the portion of the part of the image signal representing fingerprint ridges;
  transmitting only a shading-noise signal component of the part of the image signal comprising at least one of:
    dark shading noise comprising photoelectric converter noise and/or unevenness in the dark output of the photoelectric converters with respect to a reference level, and
    light-shading noise comprising uneven-lighting noise resulting from unevenness in the luminance of the image signals due to the form and reflectivity of the finger, a light source illuminating the finger, an optical system imaging an image of the finger, and/or unevenness in the sensitivity of the photoelectric converters to light reflected by the finger; and extracting from the at least a part of the image signal of the finger obtained by the sensor, the shading-noise signal component having a frequency range lower than a predetermined frequency, the predetermined frequency being lower than a frequency capable of expressing fingerprint ridges;

a shading data generating step of generating from the extracted shading-noise signal component of the at least a part of the image signal of the finger, a shading-noise signal component of another image signal of the finger comprising at least one of:

dark shading noise comprising photoelectric converter noise and/or unevenness in the dark output of the photoelectric converters with respect to a reference level; and light-shading noise comprising uneven-lighting noise resulting from unevenness in the luminance of the image signals due to the form and reflectivity of the finger, a light source illuminating the finger, an optical system imaging an image of the finger, and/or unevenness in the sensitivity of the photoelectric converters to light reflected by the finger;

a removing step of subtracting from an image signal of the finger obtained by the sensor, not having been processed by the low-pass filter step or the shading data generating step, the shading-noise signal component generated by said shading data generator, to output a difference image signal; and a verification step of matching the difference image signal output from said removing step with a pre-stored image signal.

* * * * *

UNITED STATES PATENT AND TRADEMARK OFFICE
CERTIFICATE OF CORRECTION

| | |
|---|---|
| PATENT NO. | : 7,310,434 B2 |
| APPLICATION NO. | : 10/191427 |
| DATED | : December 18, 2007 |
| INVENTOR(S) | : Kazuyuki Shigeta |

It is certified that error appears in the above-identified patent and that said Letters Patent is hereby corrected as shown below:

SHEET 7:

Figure 7, "REMIANING" should read --REMAINING--.

COLUMN 1:

Line 46, "addition" should read --additional--.

COLUMN 4:

Line 55, "IN" should read --in--.

COLUMN 5:

Line 12, "converters" should read --converter--.

COLUMN 6:

Line 8, "and then" should read --that is--; and
    Line 52, "step 322," should read --step S22,--.

COLUMN 8:

Line 7, "numeral." should read --numerals.--;
    Line 13, "numeral." should read --numerals.--; and
    Line 22, "numeral." should read --numerals.--.

COLUMN 10:

Line 2, "and LAN," should read --, and LAN--.

UNITED STATES PATENT AND TRADEMARK OFFICE
CERTIFICATE OF CORRECTION

| | |
|---|---|
| PATENT NO. | : 7,310,434 B2 |
| APPLICATION NO. | : 10/191427 |
| DATED | : December 18, 2007 |
| INVENTOR(S) | : Kazuyuki Shigeta |

It is certified that error appears in the above-identified patent and that said Letters Patent is hereby corrected as shown below:

<u>COLUMN 12</u>:

Line 18, "signal" should read --signal;--.

Signed and Sealed this

Twenty-sixth Day of August, 2008

JON W. DUDAS
*Director of the United States Patent and Trademark Office*